United States Patent [19]
Chesnut et al.

[11] Patent Number: 5,018,364
[45] Date of Patent: May 28, 1991

[54] INTERNAL AIR DAMPER FOR A COMBINATION REFRIGERATOR-FREEZER

[75] Inventors: Paul B. Chesnut, Daviess County, Ky.; Michael W. Moore; Ivan D. Sarrell, both of Dade County, Ga.

[73] Assignee: Tenelex Industries, Inc., Chattanooga, Tenn.

[21] Appl. No.: 468,356

[22] Filed: Jan. 22, 1990

[51] Int. Cl.$^5$ .................. F16K 31/02; F25D 17/04
[52] U.S. Cl. ............................. 62/187; 236/49.3; 251/129.04; 251/129.11
[58] Field of Search .................. 62/187; 236/49.3; 98/38.6, 38.7, 40.25; 251/129.04, 129.11

[56] References Cited

U.S. PATENT DOCUMENTS

| | | | |
|---|---|---|---|
| 3,251,548 | 5/1966 | Foster | 236/49.3 X |
| 3,934,797 | 1/1976 | Perlmutter | 236/49.3 X |
| 4,646,531 | 3/1987 | Song | 236/49.3 X |
| 4,646,962 | 3/1987 | Grant | 236/49.3 X |
| 4,735,057 | 4/1988 | Janke | 62/187 |

Primary Examiner—William E. Wayner
Attorney, Agent, or Firm—Warren D. Flackbert

[57] ABSTRACT

An internal air damper for a combination refrigerator-freezer which serves to maintain a preset and/or desired temperature within the refrigerator by selective passage of colder air from the freezer. The arrangement is in the form of a rotatable baffle or door which opens in response to a temperature demand. The amount of colder air passage can be made available through either of two modes, i.e. by stopping the baffle at an open position to allow cool air flow into the refrigerator until the thermostat is satisfied, and, prior to reaching a freezing thermostat temperature, reenergizing the motor for baffle movement to closed position, or moving the baffle to an open position, and continuing baffle movement for gradual and better distribution of the colder air until the thermometer is satisfied and the baffle stops at a closed position.

7 Claims, 1 Drawing Sheet

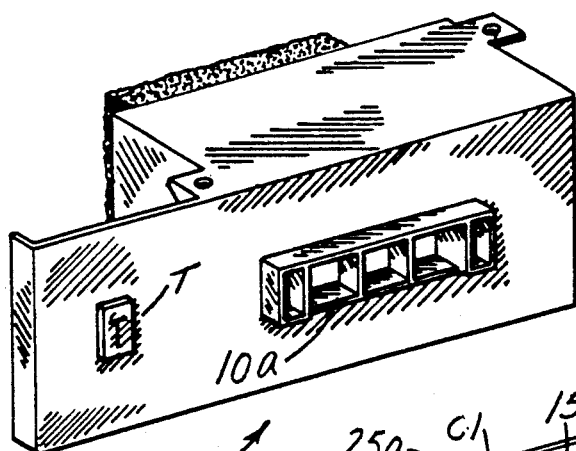
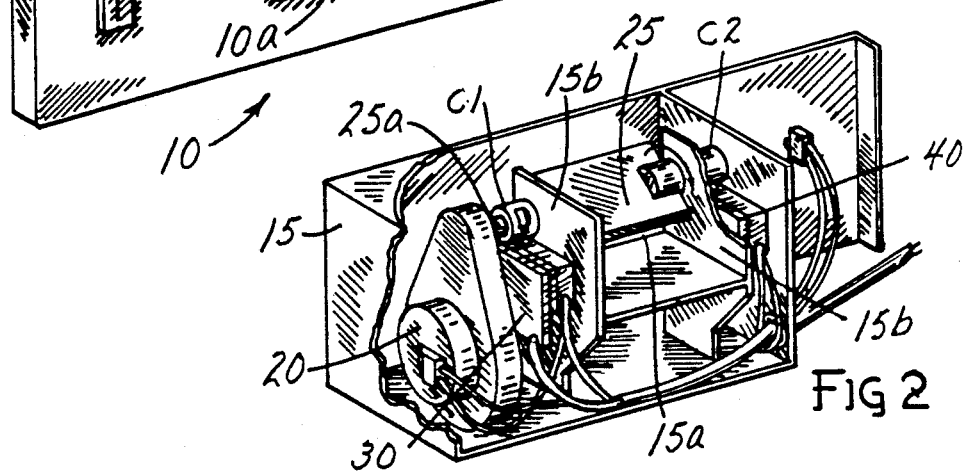
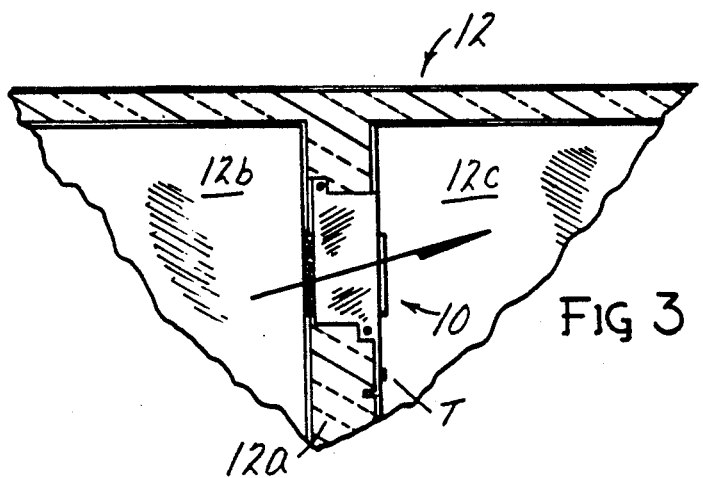
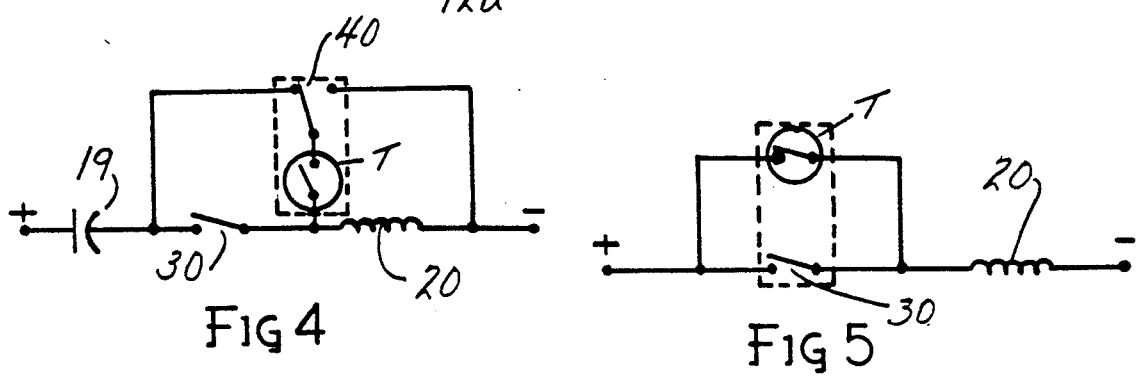

INTERNAL AIR DAMPER FOR A COMBINATION REFRIGERATOR-FREEZER

As is known, it is desirable to maintain a preset temperature within a refrigerator-freezer, where such is typically controlled thermostatically and/or electrically; however, the possibility of temperature variation is great, depending, by way of example, on refrigerator entry door usage; control techniques; and, even refrigeration effectiveness.

An approach to implementing and/or diminishing refrigerator air temperature by means of freezer temperature is the significant feature of the invention herein, where, more particularly, a rotatable air damper or baffle is provided which, selectively, opens and closes automatically to maintain the desired preset temperature interval.

BRIEF DESCRIPTION OF THE INVENTION

The invention is operable in, at least, two different modes, where, in one, the rotatable air damper is stopped either in a fully closed position or in a fully opened position. When the refrigerator requires cooling, a thermostat, or similar device, will energize a motor circuit, stopping the air baffle at an open position and allowing cooler air to flow from the freezer into the refrigerator. Unpon satisfying the desired temperature, and prior to reaching freezing air temperature, the aforesaid motor becomes energized and rotates the air baffle until the latter reaches a closed position.

In another approach, the rotating air damper is initially fully closed, as before, but, upon demand, rotates to a fully opened position, and due to a holding (switch) function, may continue to rotate, continually distributing air in all direcitons for improved and more uniform cooling. In other words, with such approach, the air damper does not necessarily stop when a first fully opened condition is achieved, but may continue to rotate (since the thermostat does not indicate that the temperature demand has been achieved.

The invention serves and/or provides various advantages, among those are the use of a single compressor system controlled by refrigerator and freezer temperature; the elimination of the need for a heater to prevent air damper freezing, thereby, reducing energy usage and, as well, wiring connections; the provision of a reliable operational sequence, without jamming possibilities, through the use of a powerfull gear reduction motor; the elimination of the need for electronic or DC voltage; the employing of cam operated position switches; and, accomplishing operation with any form of switching device. as a thermostat, a relay, an electronic controlled output, or the like.

BRIEF DESCRIPTION OF THE FIGURES

A better understanding of the present invention will become more apparent from the following description, taken in conjuction with the accompanying drawing, wherein FIG. 1 is an isometric view looking toward the front of an air damper arrangement in accordance with the teachings of the present invention;

FIG. 2 is another isometric view, partly broken away, and comparable to FIG. 1, but looking towards the rear of the instant air damper arrangement;

FIG. 3 is a top plan view showing a typical installation of the instant air damper in a side-by-side refrigerator-freezer;

FIG. 4 is a schematic view of circuitry arranged for one mode of air damper control; and, FIG. 5 is another schematic view of circuitry arranged for another mode of air damper control.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, and particularly FIG. 3, the air damper 10 herein is shown in a typical installation site, i.e. within the common wall 12a of a conventional side-by-side refrigerator-freezer 12. The arrow indicates the air flow path, i.e. from freezer 12b to refrigerator 12c. FIG. 1 depicts the front of the air damper 10, as when viewed from right to left in FIG. 3, i.e. from the refrigerator 12c.

As should be evident, the front of the air damper 10 includes a series of louvers 10a for controlling air flow, i.e. in combination with the position of the damper per se. Control is typically achieved through a thermometer T located on the front surface of the air damper 10 and generally within the refrigerator 12c (again see FIG. 3).

Looking now at FIG. 2, the air damper 10 of the invention is typically disposed within a frame 15 supporting a drive motor 20. The frame 15 includes an opening 15a defined by inwardly extending end flanges 15b, such providing support for a rotatable air baffle or door 25 on pins 25a. In other words, drive motor 20 serves to control rotational movement of air door or barrier 25, to be discussed more fully herebelow. The surfaces of the air door or baffle 25 are generally elliptical in vertical section.

The pins 25a at each end of the air door 25 respectively mount cam C1, C2 which, in turn, selectively control operation of (micro) switches 30, 40. The electromechanical operating arrangement is itemized by a capacitor 19, the switch 30 (which is single-pole single-throw), the switch 40 (which is single-pole double-throw), and a coil for drive motor 20 (also see FIGS. 4 and 5).

A thermostat relay, and electric control outlet or the like, T, forms part of the circuitry of FIG. 4 and, as well, the circuitry of FIG. 5. It will be evident that the circuitry of FIGS. 4 and 5 is each in parallel.

Considering operation and referring to the circuitry of FIG. 4, and at an initial condition prior to a demand for cooling from the refrigerator 12c, switch 30 is normally open, and switch 40 is normally closed. Thermostat T is open and closes when cooling is demanded. It should be noted that both switch 30 and switch 40 are, as well, responsive to air damper door 25 position.

With the thermostat T closed, motor 20 operates through switch 40, moving the air damper 20 from its initially closed position about one-fourth revolution towards an open position. Air then flows from the freezer 12b into the refrigerator 12c. Switch 40 opens responsive to cam C2 (through snap action), and because of simultaneous action of cam C1, switch 30 closes.

Importantly at such time, the capacitor 19, which is appropriately sized, prevents motor 20 burn-up because of shorting, considering that the open switch 40 and the thermostat T make up one interrupted electrical line or path and the closed switch 30 and the rive motor 20 coil make up another non-interrupted line or path.

Operation continues until thermostat T is satisfied, i.e. reaches a cold setting. The thermostat T then opens. Motor 20 is no longer being shorted, but continues to operate the air barrier 25 for 90° or until closed, i.e. until cams C1, C2 place switches 30, 40 in normal, and respective, open-closed positions. The procedure is now ready for repeating.

In the operation of the circuitry of FIG. 5 (using only cam C1), again air barrier 25 is at a closed position and thermostat T closes when cooling is required. Switch 30 is open. Motor 20 rotates air barrier 25 about 5° to 10°. Cam C1 detent then closes switch 30, actually serving a holding function to assure motor 20 rotation for one complete revolution. Cam C1 periodically opens switch 30 at a rest or fully closed position. If the thermostat T is not satisfied, motor 20 continues to rotate air barrier 25 until after the thermostat T opens. Thus, the cooling interval is extended, serving to permit improved air distribution.

It should be apparent from the preceding that the internal air damper presented by the invention serves importance in maintaining a preset temperature by permitting selective air passage from the freezer to the refrigerator upon demand, as from a thermostat. While the discussion hereabove is generally directed to use of the invention in a side-by-side refrigerator-freezer, it should be understood that the internal air damper is also usable, by cabinet modification, in a refrigerator having a top located freezer compartment.

Moreover, the internal air damper arrangement described hereabove is susceptible to various changes within the spirit of the invention, including, by way of example, in proportioning; the specific type of each selected component; the physical placement of the cold air flow ports; the use of a single or individual cams; the manner and/or site of arrangement installation; and, the like.

Thus, the preceding should be considered illustrative and not as limiting the scope of the following claims.

We claim:

1. An arrangement for introducing air from the freezer section to the refrigerator section of a refrigeration unit comprising a housing disposed within a wall separating said freezer section and said refrigerator section, said housing having an opening permitting air passage from said freezer section to said refrigerator section, a rotatable baffle mounted on said housing and selectively blocking said air passage from said freezer section to said refrigerator section, and electromechanical circuitry, including a temperature sensor, cam means, switching means, capacitor means and a baffle drive motor, where said switching means is responsive to rotation of said cam means, where rotation of said cam means and said baffle is simultaneous, and where said capacitor means is in series with said baffle drive motor and at a value preventing baffle drive motor burn-up because of shorting, whereby said electromechanical circuitry selectively actuates partial movement of said baffle from a fully closed air blocking position to a stopped open position, and whereby said baffle moves again to said fully closed air blocking position when said temperature sensor reaches a preselected condition.

2. The arrangement of claim 1 where said electromechanical circuitry causes said baffle to return to said fully closed position before the passing air reaches a freezing temperature in said refrigerator section.

3. The arrangement of claim 1 where said baffle continues to rotate and distribute colder air until a temperature sensor demand is satisfied and said baffle stops at said fully closed air blocking position.

4. The arrangement of claim 1 where said cam means of said electromechanical circuitry causes operation of said switching means after preselected incremental rotation of said baffle from said fully closed air blocking position.

5. The arrangement of claim 4 where said cam means causes simultaneous operation of a first and a second switching means to achieve selective circuit response.

6. The arrangement of claim 3 where said electromechanical circuitry includes a temperature sensor, cam means, switching means and a baffle drive motor, and where said cam means periodically opens said switching means, and where said baffle drive motor continues to operate until after said temperature sensor is satisfied.

7. The arrangement of claim 6 where said cam means serves a holding function to assure baffle drive motor rotation.

* * * * *